United States Patent
Satomi et al.

[11] 3,926,429
[45] Dec. 16, 1975

[54] COPY SHEET STRIPPING DEVICE

[75] Inventors: Toyokazu Satomi, Yokohama; Yasumori Nagahara, Yokosuka; Teruo Narita, Tokyo, all of Japan

[73] Assignee: Ricoh Co., Ltd., Tokyo, Japan

[22] Filed: Nov. 21, 1973

[21] Appl. No.: 417,934

[30] Foreign Application Priority Data
Dec. 2, 1972   Japan.............................. 47-120829

[52] U.S. Cl. ............ 271/174; 271/259; 271/DIG. 2
[51] Int. Cl.² ......................................... B65H 29/56
[58] Field of Search ........ 271/DIG. 2, 174, 80, 258, 271/259

[56] References Cited
UNITED STATES PATENTS

| | | | |
|---|---|---|---|
| 2,793,035 | 5/1957 | Wroblewski.......................... | 271/259 |
| 3,693,969 | 9/1972 | Sakamaki et al. ................... | 271/258 |
| 3,704,881 | 12/1972 | Suda............................... | 271/DIG. 2 |
| 3,722,773 | 3/1973 | Plate et al........................... | 271/263 |
| 3,791,729 | 2/1974 | Steiner........................... | 271/DIG. 2 |

*Primary Examiner*—Evon C. Blunk
*Assistant Examiner*—Bruce H. Stoner, Jr.
*Attorney, Agent, or Firm*—Cooper, Dunham, Clark, Griffin & Moran

[57] ABSTRACT

A device for use with an electrophotographic apparatus of the type comprising a movable member adapted to carry thereon an intermediate image of an original while it moves for printing such intermediate image on a copy sheet by transfer-printing at a transfer-printing station. Such device comprises a pick-off claw means for stripping the copy sheet off the movable member at the sheet stripping station after the image has been printed on the sheet, control means for controlling the movements of the pick-off claw means into and out of engagement with the peripheral surface of the movable member, and copy sheet detecting means disposed on the sheet passageway from the transfer-printing station to the sheet stripping station. The pick-off claw means control means is actuated when the movement of the copy sheet is detected by the copy sheet detecting means whereby the pick-off claw means can be rendered operative at an opportune moment to strip the copy sheet off the movable member.

4 Claims, 12 Drawing Figures

COPY SHEET STRIPPING DEVICE

BACKGROUND OF THE INVENTION

This invention relates to a copy sheet stripping device adapted for use with an electrophotographic apparatus of the type wherein an intermediate image, e.g. an electrostatic latent image or toner image, carried by a movable member is printed by transfer-printing onto a copy sheet, and which device is adapted to remove, from the peripheral surface of the movable member at the terminating stages of the transfer-printing step, the printed copy sheet which electrostatically or otherwise adheres to the movable member.

More particularly, in electrophotographic apparatus using the so-called transfer-printing system, an intermediate image of an original to be copied, e.g. an electrostatic latent image or toner image, is formed on a movable member, such, for example, as a photosensitive drum formed thereon with a photoconductive material layer or a dielectric layer or a photosensitive belt produced by using an organic photoconductive material, and such intermediate image is printed on a copy sheet made of insulated recording paper or ordinary paper by pressing contact, corona discharge or electrostatic contact. In such apparatus, the copy sheet electrostatically or otherwise adheres to the peripheral surface of the movable member, so that it is necessary to strip the copy sheet off the movable member by some means without damaging the surface of the movable member after transfer-printing of the image is finished.

To this end, various methods have been developed. In one method, a sheet pick-off claw means is used which is maintained in engagement with the surface of the movable member at all times to strip the copy sheet off the movable member. In another method, an air ejection tube is employed to blow a stream of air against the surface of the movable member to strip the copy sheet off the movable member; and still another method proposes to use a suction drum for stripping the copy sheet off the movable member by drawing the same by suction in the neighborhood of the movable member. The method using a sheet pick-off claw means has a variation in which the pick-off claw means is adapted to oscillate as shown in FIG. 1.

The use of the oscillatable pick-off claw means shown in FIG. 1 offers advantages in that the possibilities of damaging the copy sheet or the surface of the movable member are substantially eliminated and the device is simple in construction. The method using the oscillatable pick-off claw means is thus much superior to other methods available. However, the present invention is intended to improve upon it, so that for a full understanding the copy sheet stripping device using an oscillatable pick-off claw means will be described in some detail as used with a movable member which is in drum form.

In FIG. 1, a drum 1 which rotates in the direction of an arrow $a$ has, electrostatically or otherwise adhering to its peripheral surface, a copy sheet 2 formed thereon with an intermediate image of an original to be copied, e.g. and electrostatic latent image or toner image. Mounted in the neighborhood of the peripheral surface of the drum 1 is a pick-off claw means 3 comprising a plurality of claw members pivotally supported at the base by a shaft 4 and arranged in side-by-side relationship, the number of the claw members varying depending on the width of the copy sheets to be handled. Each claw member has at its free end a claw 3a and an abutting portion 3b contiguous with the claw 3a. Each member of the pick-off claw means 3 has a shoulder 3c projecting rightwardly in FIG. 1 and is normally urged to move in the direction of an arrow $b$ by the presence of the rightwardly projecting shoulder 3c and bring the claw 3a into engagement with the peripheral surface of the drum 1. Each shoulder 3c is formed therein with an arcuate slot 3d, with the shaft 4 being disposed with its center at the center of the arc.

A plurality of arms 5 equal in number to the claw members are each secured at the base to the shaft 4 and each has, attached to the forward end portion, a pin 6 received in the arcuate slot 3d. The shaft 4 is supported at opposite ends by immovable members and has, secured to one end thereof, an arm member 7 which extends toward a cam 8 mounted coaxially with the drum 1. The arm member 7 mounts at its forward end a roller 9 which is in engagement with the edge of the cam 8. The roller 9 is urged into engagement with the cam 8 by a spring (not shown) or other suitable means.

The cam 8 is formed at its edge with a recess 8a in which the roller 9 moving toward the center of the cam 8 drops, as the leading end of the copy sheet 2 draws near the claws 3a of the strip-off claw means 3. Engagement of the roller 9 in the recess 8a causes the shaft 4 and arms 5 to move in the direction of an arrow $c$ through the arm member 7.

Before the arms 5 move in the direction of the arrow $c$, the claws 3a are out of engagement with the peripheral surface of the drum 1 because the pins 6 are in engagement with the upper ends of the slots 3d and hold the claw members in the upper position. However, the pins 6 move downwardly when the arms 5 move in the direction of the arrow $c$ as shown in FIG. 1, so that the claws 3a are brought into engagement with the peripheral surface of the drum 1 by virtue of the weight of the claw member 3. However, a spring or other suitable means may be used to bring the claws 3a into engagement with the drum 1.

The leading end of the copy sheet 2 is then picked off the peripheral surface of the drum 1 by means of the claws 3a which have been brought into engagement with the peripheral surface of the drum 1 and is brought into abutting engagement with the abutting portions 3b of the claw means 3, so that the copy sheet 2 and the abutting portions 3b move into dash-and-dot line positions 2A and 3A respectively.

An endless belt means 13 formed therein with a large number of openings 13a is disposed below the position 2A. The endless belt means 13 is trained over belt rollers 10 and 11 and has a suction box 12 interposed between its upper and lower runs. When the leading end of the copy sheet 2 comes to the position 2A, the copy sheet 2 is drawn by suction from the suction box 12 and attracted to the surface of the endless belt means 13 as shown at 2B. Since the belt of the endless belt means 13 moves in the direction of an arrow $d$, the copy sheet 2 is conveyed to a developing station or fixing station for further processing. The suction box 12 is formed in its top wall with a large number of openings 12a and at its side with a port 12b which is connected with a pump (not shown) and maintained in communication with a vacuum source.

Meanwhile, the abutting portions 3b of the claw means 3 are released from engagement with the copy sheet 2 in the position 3A and each claw member moves downwardly by its own weight back into the sheet pick-off position. At this time or slightly before or after that, the roller is removed from the recess 8a in the edge of the cam 8 and the arms 5 are restored to their original position, so that the pick-off claw means 3 is released from the pick-off position and returns to the original position in which the claws 3a are spaced apart from the peripheral surface of the drum 1.

As aforementioned, the sheet pick-off device of this construction offers the advantages of not tending to damage the drum surface and the surface of the copy sheet and of being very simple in construction. This device operates such that the time at which the pick-off claw means is placed in the sheet pick-off position is controlled by the cam rotating with the drum. By this arrangement, a sheet pick-off operation is performed each time the drum rotates to perform a copying operation. This device has various disadvantages as presently to be described.

a. The pick-off claw means is brought into engagement with the drum each time a copying step is repeated, so that the pick-off claw means is moved in a dry run into engagement with the drum even if no copy sheet is fed, possibly damaging the peripheral surface of the drum. The damage may be great when the drum is constructed to have a photoreceptor on its peripheral surface;

b. The pick-off claw means is moved into engagement with the drum at exactly the same time in each copying step, so that it engages the drum even though no copy sheet is supplied to the peeling position or the pick-off claw means may not be in engagement with the drum when the copy sheet leading end reaches the pick-off position in a case where there is a variation in the time of supply of copy sheets. This results in the copy sheet stripping not being performed satisfactorily. To eliminate this disadvantage, proposals have been made to adjust the cam edge such that the pick-off claw means is brought into engagement with the drum earlier than the actual pick-off time. However, this arrangement limits the scope of use of the peripheral surface of the drum or tends to damage the effective surface area of the drum because the time interval during which the claw means is maintained in engagement with the drum is prolonged;

c. In the case where each copy sheet is severed from a copy strip in roll form, the supply of each copy sheet tends to be delayed by the inertial resistance offered by the roll when the strip is paid out of the roll, so that the pick-off claw means may operate in a dry run if it is set to come into engagement with the drum regularly at a predetermined time. This may result in the drum being damaged and the sheet not being stripped off the drum satisfactorily; and d. The copying apparatus in which the sheet pick-off claw means is brought into engagement with the drum in each copying step may be shut off while the pick-off claw means is in engagement with the drum. If the drum is removed from the apparatus while the pick-off claw means is in this position, the peripheral surface of the drum may be scratched by the claw means.

SUMMARY OF THE INVENTION

This present invention embodies a copy sheet stripping device provided with sheet pick-off claw means constructed and operating in a manner similar to the aforementioned prior art device, but, which comprises a control means for controlling the time at which the sheet pick-off claw means is brought into the pick-off position on the movable member whereby the time is determined according to the progress in the movement of each copy sheet, so that the aforementioned disadvantages of the prior art can be obviated.

One of the outstanding characteristics of this invention is the provision of sheet pick-off control means which enables the sheet pick-off claw means to move to an operative or sheet pick-off position only when a copy sheet is fed to such position. This arrangement is effective to eliminate dry run operations of the sheet pick-off claw means, so that no damage is caused to the peripheral surface of the movable member. Since the sheet pick-off claw means is actuated upon detection of a copy sheet being fed thereto, the movement of the claw means into the pick-off position takes place simultaneously with the movement of a copy sheet into such position. If no copy sheet is fed to the pick-off position, then the claw means is prevented from coming into engagement with the movable member. Thus there is no possibility of the copying apparatus being shut off while the sheet pick-off claw means is maintained in engagement with the movable member.

Another outstanding characteristic of the invention is the provision of sheet jam detection means associated with the sheet detection means and disposed in the sheet stripping station or in the vicinity thereof, such sheet jam detection means being effective to detect the occurrence of a sheet jam or other trouble involving the copy sheet fed to the sheet stripping station or on the upstream side thereof and to issue a warning. This arrangement enables the actuation of the sheet detection means for stripping a sheet to be utilized also for detecting a sheet jam or other trouble, thereby ensuring that the sheet pick-off claw means is moved into the pick-off position only when a sheet is in the stripping position. By constructing the device such that the sheet pick-off claw means can be moved into a non-operative position either independently of or simultaneously with the actuation of a warning signal producing member as soon as a sheet jam is detected, it is possible to keep the claw means from coming into engagement with the peripheral surface of the movable member more than is necessary.

DESCRIPTION OF EMBODIMENTS

Figure 1:
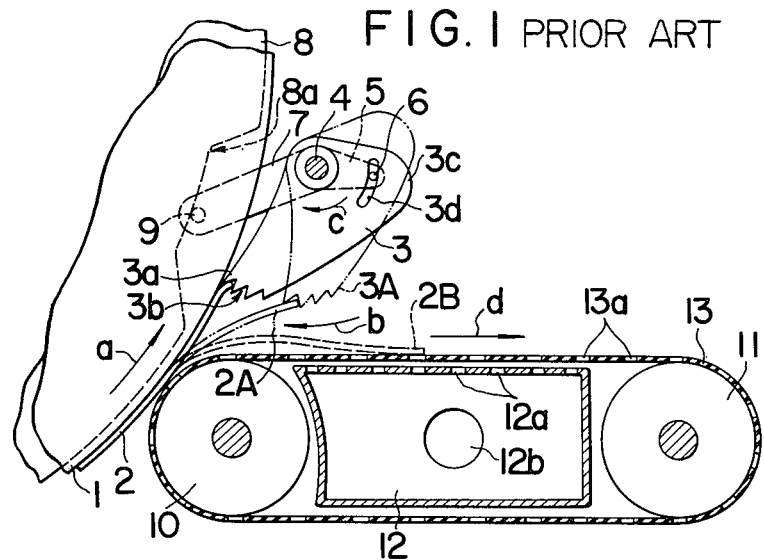
FIG. 1 is a sectional side view of a sheet stripping device of the prior art.

The invention will now be described with reference to the embodiments shown in FIG. 2 to FIG. 12. While a drum is used in these embodiments as a movable member, it is to be understood that the drum can be replaced by a belt or the like. In all the drawings, like reference characters designate similar parts, and the description of similar parts will not be repeated.

Figure 2:
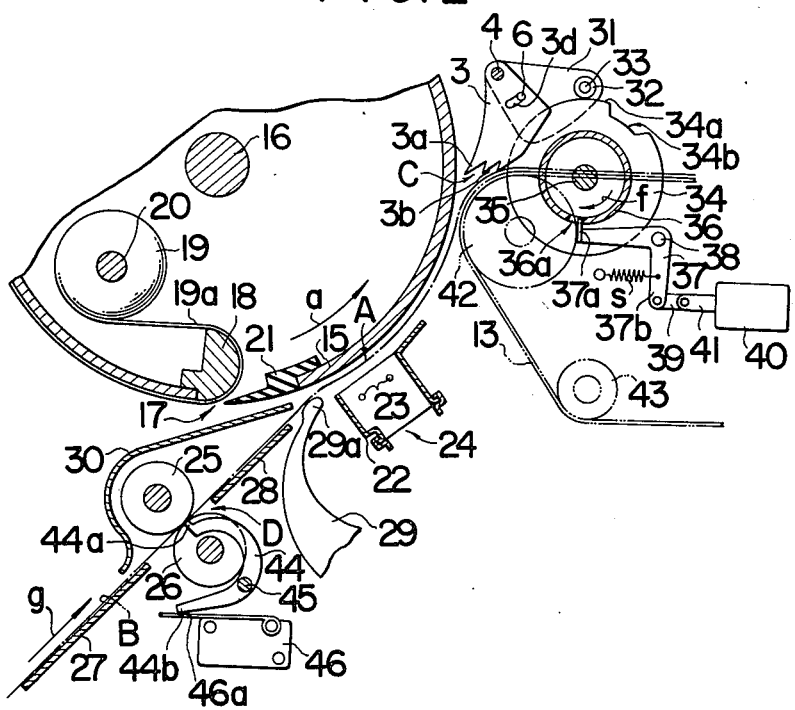
FIG. 2 to FIG. 5 are sectional side views of the sheet stripping device comprising a first embodiment of the invention, showing its manner of operation.

In FIG. 2, a drum 15 supported by a shaft 16 for rotation in the direction of an arrow $a$ at a constant rate is formed with a slit 17 in one portion thereof and has secured to one edge of the slit 17 a turn-back member 18 provided with an arcuate turn-back surface.

A roll film 19 is supported on a shaft 20 and disposed in the interior of the drum 15. The roll film 19 has a leading end portion 19a which extends through the slit 17 along the turn-back portion 18 onto the peripheral surface of the drum 15 where it is maintained in intimate contact with the drum surface. Although not shown, a portion of the film following the leading end portion 19a is wound about the drum for the extent of about ¾ the circumference of the drum and then introduced into the interior of the drum by means similar to the slit 17 and turn-back member 18 to be wound under tension on a take-up shaft similar to the shaft 20. The slit 17 can be closed by a shield 21.

As the roll film 19, a photosensitive film coated on its surface with selenium, zinc oxide, poly-N-vinyl carbazole and the like material may be used when the drum 15 is used in ordinary electrophotography. Alternatively, the drum 15 itself may include any one of the aforementioned photosensitive material layers or other dielectric layer directly attached thereto.

A transfer-printing station A is disposed rightwardly downwardly of the drum 15 in FIG. 2 where a transfer-printing charger 24 is disposed. The charger 24 comprises a frame 22 and a wire electrode 23 disposed in the frame 22 and arranged in spaced juxtaposed relation to the peripheral surface of the drum 15. The charger 24 may be replaced by transfer-printing roller or other known transfer-printing means.

A sheet path B extending between the drum 15 and the charger 24 is disposed on the upstream side of the transfer-printing station A or leftwardly downwardly of the drum 15 in FIG. 2. The sheet path B is defined by a pair of conveyor rollers 25 and 26, sheet guide plates 27 and 28 disposed anterior and posterior to the conveyor rolls respectively, a guide plate 29 including a guide edge 29a, and a sheet guide plate 30.

One form of the sheet pick-off claw means control means according to the invention will now be described. A sheet stripping station C is disposed rightwardly of the drum 15 in FIG. 2. In this station, pick-off claw means 3 pivotally supported by the shaft 4 includes claws 3a disposed in spaced juxtaposed relationship to the peripheral surface of the drum 15.

The pins 6 received in the slots 3d formed in the pick-off claw means 3 are attached to a follower 31 pivotally supported by the shaft 4 and supporting at one end portion thereof a roller 32 on axle 33 which is maintained in rolling engagement by its own weight with an edge of a cam 34 loosely supported by a shaft 35 disposed rightwardly of the drum 15 in FIG. 2 and adapted to rotate at a constant rate in the direction of an arrow $f$. The cam 34 is maintained in frictional engagement with the shaft 35 by suitable means.

A cylindrical engaged wheel 36 is concentrically affixed to one surface of the cam 34 and formed in its peripheral surface with a cutout 36a. An engaging portion 37a formed at one end of a lock lever 37 is maintained in engagement with the cutout 36a so as to lock the engaged wheel 36 and the cam 34 substantially integral therewith. The cutout 36a is disposed ahead of a valley 34b, formed in the cam 34, by a circumferential extent of about 180°, so that the valley 34b is disposed forwardly of and diametrically opposite the roller 32.

The lock lever 37 is pivotally supported by a shaft 38 and urged by the biasing force of a spring S to move rightwardly about shaft 38 in FIG. 2 so as to bring the engaging portion 37a into engagement with the engaged wheel 36. The lock lever 37 has an arm 37b which is connected to an actuator 41 of a solenoid 40 through a connector 39.

When the solenoid 40 is inoperative, the lock lever 37 maintains the engaged wheel 36 and cam 34 in locked position in which the roller 32 is in engagement with a major diameter cam edge 34a of the cam 34. When the roller 32 is on the major diameter cam edge 34a, the follower 31 is moved rightwardly to an upper position about the shaft 4, so that the pick-off claw means 3 is moved upwardly by the pins 6 into a position in which the claws 3a are released from engagement with the peripheral surface of the drum 15.

The sheet pick-off claw means control means according to the invention is constructed as aforementioned. However, it is to be understood that the invention is not limited to this specific form of control means and that any other form of control means may be used to attain the end.

An endless belt 13 trained over belt rollers 42 and 43 is disposed rightwardly downwardly of the sheet stripping station C in FIG. 2. A suction box (not shown) similar to the suction box 12 is arranged beneath the upper run of the endless belt 13.

A sheet detection station D is disposed on the sheet path B in the vicinity of the conveyor rollers 25 and 26. A detection portion 44a mounted on one arm of a sheet detection lever 44 pivotally supported by a shaft 45 is disposed in the sheet detection station D. The sheet detection lever 44 has mounted on the other arm thereof a pressing portion 44b which is maintained in engagement with an actuator 46a of a normally closed switch 46 and presses the same by its own weight to open the switch 46. The switch 46, which is operatively connected to the solenoid 40, de-energizes the solenoid 40 when the actuator 46a is pressed by the detection lever 44 to bring the switch 46 to an open position.

The sheet detection means is constructed as aforementioned. It is to be understood, however, that the invention is not limited to this specific form of sheet detection means and that any other means may be used. Such means may comprise a normally open switch having its actuator directly disposed on the sheet path B, or a photoelectric transducer element, for example.

The copy sheet 2, which is a transfer-printing sheet made as of electrostatic recording paper or ordinary paper, is fed by suitable sheet feed means and moved in the direction of an arrow $g$ along the sheet path B in accordance with sheet feed instructions given in timed relation to the rotation of the drum 15.

Figure 3:
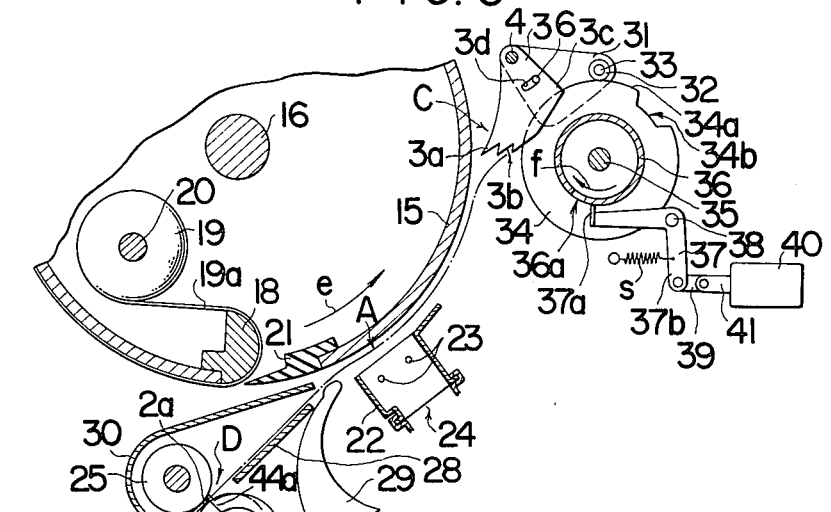

As seen in FIG. 3, upon the leading end 2a of the copy sheet 2 pressing against the detection portion 44a of the detection lever 44 on the sheet path B, the detection lever 44 moves rightwardly about the shaft 45 and removes the pressure applied by the pressing portion 44b to the actuator 46a of the switch 46, so that the switch 46 is closed.

Upon the closing of the switch 46, the solenoid 40 is temporarily energized and pulls the actuator 41 toward the solenoid 40, so that the lock lever 37 moves rightwardly about the shaft 38 and the engaging portion 37a is released from engagement in the cutout 36a in the engaged wheel 36.

Disengagement of the engaging portion 37a from the cutout 36a results in the engaged wheel 36 and cam 34 being brought into frictional engagement with the shaft 35 rotating in the direction of the arrow f at the predetemined rate, so that the engaged wheel 36 and cam 34 rotate with the shaft 35 as a unit. After lapse of a predetermined time interval, the valley 34b of the cam 34 reaches a position which corresponds to the position of the roller 32 attached to the follower 31. As soon as the cam 34 begins to rotate, the solenoid 40 is de-energized and the lock lever 37 is restored toward its original position by the springs as a result of which the engaging portion 37a is maintained in engagement with the peripheral surface of the engaged wheel 36.

Figure 4:
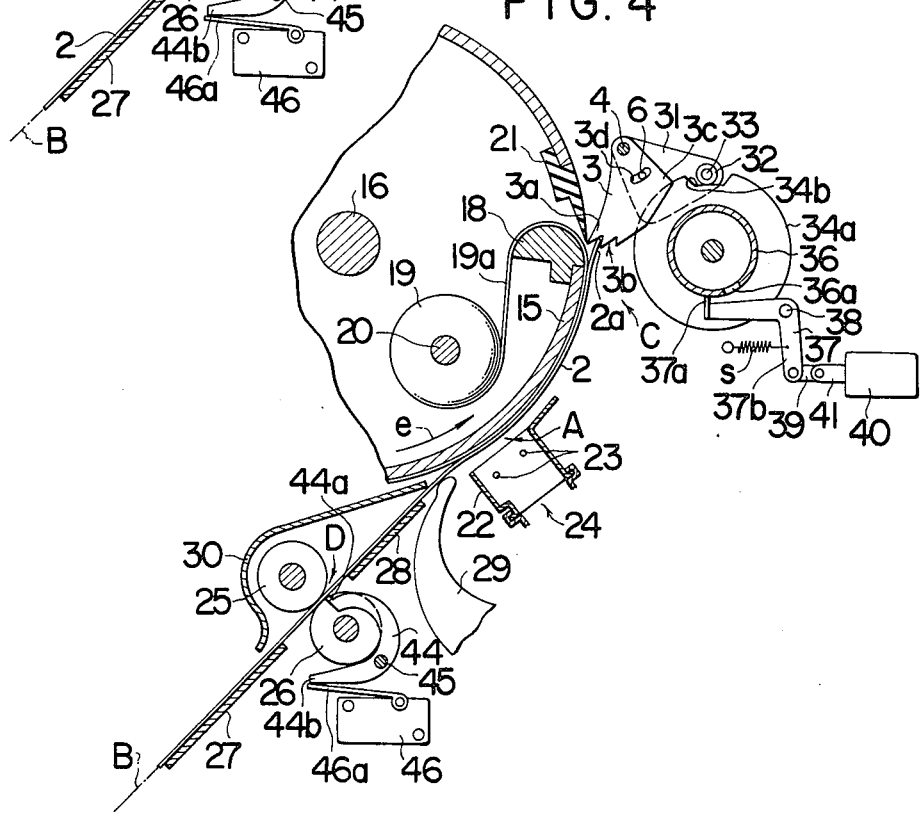

The rate of rotation of the shaft 35 is set such that the leading end of the copy sheet 2 reaches the vicinity of the sheet stripping station C after passing through the transfer-printing station A at the same time as the roller 32 draws near the valley 34b. Upon the roller 32 dropping into the valley 34b, the follower 31 moves rightwardly about the shaft 4 and the pins 6 move in the slots 3d, so that the sheet pick-off claw means 3 is brought to a position from which it can move freely in pivotal motion. When brought to this position, the sheet pick-off means 3 moves by its own weight into a sheet pick-off position in which it is maintained in contact with the peripheral surface of the drum 15. Thus the sheet pick-off claw means 3 is ready for a sheet pick-off operation as shown in FIG. 4. As shown, the claws 3a are in engagement with the outer surface of the shield 21 of the drum 15.

Figure 5:
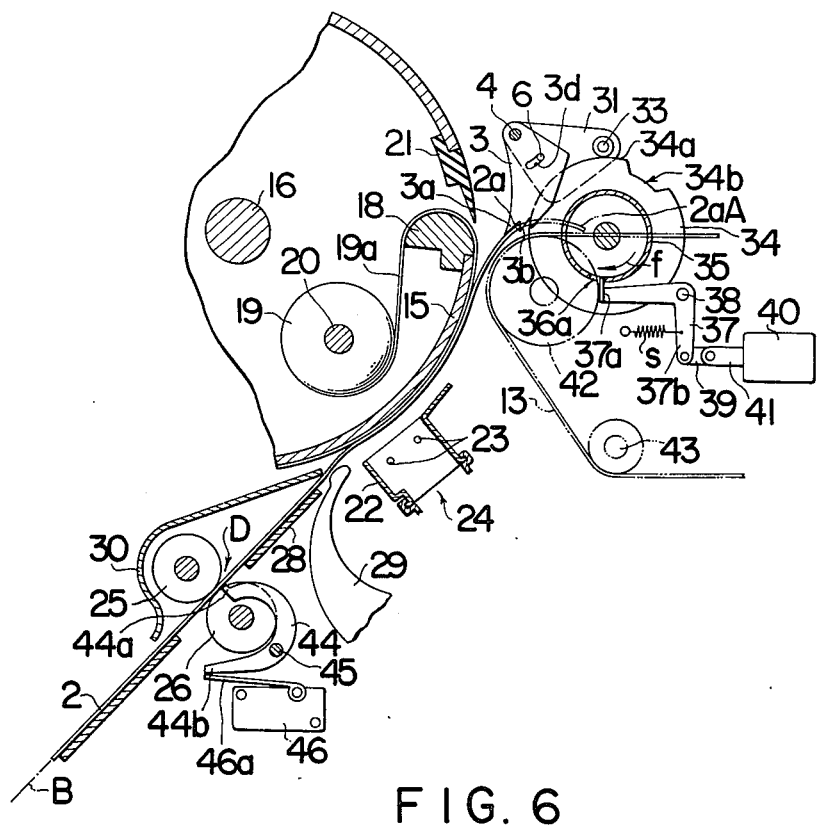

Immediately after the claws 3a of the sheet pick-off claw means 3 are brought into engagement with the peripheral surface of the drum 15, the leading end 2a of the copy sheet 2 is brought into engagement with the claws 3a and picked off the drum 15 thereby as the drum 15 rotates. When picked off the drum 15 by the claws 3a, the leading end 2a of the copy sheet 2 is carried by the abutting portions 3b and moved on to the upper run of the endless belt 13 in dash-and-dot lines 2aA as shown in FIG. 5.

Upon completion of the picking of the copy sheet 3 off the drum 15, the roller 32 is released from engagement in the valley 34b, so that the follower 31 moves the sheet pick-off means 3 out of the sheet pick-off position. The engaged wheel 35 moves into the original position in which the cutout 34a is disposed in a position corresponding to that of the engaging portion 37a of the lock lever 37, so that the engaging portion 37a is brought into engagement with the cutout 34a. This interrupts rotation of the engaged wheel 36 and cam 34.

According to the invention, the cam 34 performs the function of a sort of timer. Thus, a timer of the spring type or the electric type may be used and arranged between the sheet detection means and the solenoid 40 which is adapted directly to actuate the follower 31. If the sheet detection means can be arranged in the vicinity of the sheet stripping station C, the timer may be eliminated. In the invention, an electromagnetic clutch may be used as means for interconnecting the shaft 35 and cam 34 so that the electromagnetic clutch may concurrently perform the function of a solenoid.

Figure 6:
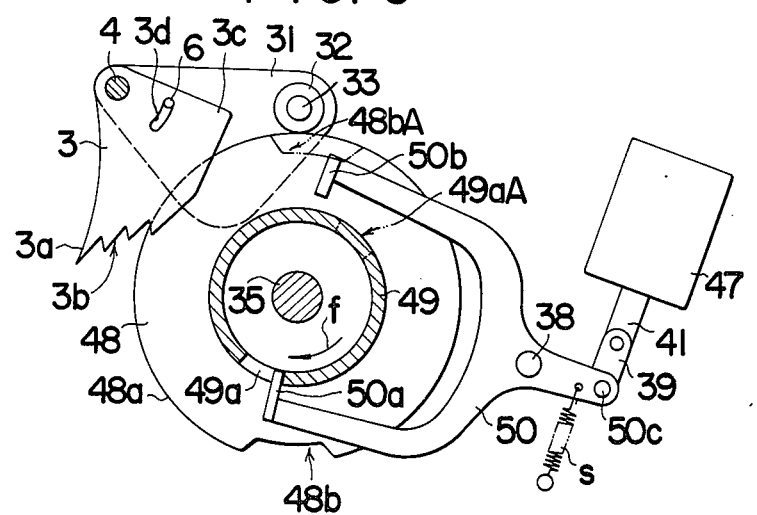
FIG. 6 is a side view showing cam control means.

FIG. 6 shows sheet pick-off claw control means comprising a solenoid 47 corresponding to the solenoid 40 and adapted to remain energized during the time the switch 46 is closed, and adapted to operate in association with the sheet detection means shown in FIG. 2. As shown, the roller 32 attached to the follower 31 keeps the sheet pick-off means 3 out of the sheet pick-off position when the roller 32 is in engagement with the major diameter portion 48a of the cam 48. The cutout 49a formed in the engaged wheel 49 substantially integral with the cam 48 is disposed slightly ahead of the valley 48b formed in the cam 48. The cutout 49a is disposed ahead of the roller 32 for a circumferential extent of about 180°. A lock lever 50 substantially in the form of a letter Y, has on one arm an engaging portion 50a received in the cutout 49a to lock the engaged wheel 49 and on another arm an engaging portion 50b disposed above the engaging portion 50a symmetrically therewith, and is positioned against the engaged wheel 49. The Y-shaped lock-lever 50 has its remaining arm extending in a direction perpendicular to the engaging portions 50a, 50b and connected at 50c to the solenoid 47.

If the copy sheet 2 is detected and the switch 46 is closed to energize the solenoid 47, the engaging portion 50a is released from engagement with the engaged wheel 49 and the cam 48 begins to rotate. The cam rotates in the direction of the arrow f till the roller 32 is positioned against the valley 48b. As soon as the roller 32 drops into the valley 48b, the engaging portion 50b which has been brought into and maintained in engagement with the peripheral surface of the engaged portion 49 by the continued energization of the solenoid 47 drops into the cutout 49a and locks the engaged wheel 49. The positions occupied by the valley and the cutout at this time are designated 48bA and 49aA respectively in FIG. 6.

Engagement of the roller 32 in the valley 48b moves the sheet pick-off claw means 3 into a sheet pick-off position, so that the copy sheet 2 is picked off the peripheral surface of the drum 15. The roller 32 is maintained in engagement in the valley 48b during the time the copy sheet 2 closes the switch 46 at the detection station D and the solenoid 47 remains energized. However, the switch 46 is opened and the solenoid is de-energized when the trailing end of the copy sheet 2 emerges from the detection section D, which is at substantially the same time as the picked-off copy sheet 2 moves on to the upper run of the endless belt 13. This releases the roller 32 from engagement in the valley 48b. More specifically, deenergization of the solenoid 47 releases the engaging portion 50b from engagement with the cutout 49a and brings the engaging portion 50a into engagement with the peripheral surface of the engaged wheel 49, thereby permitting the engaged wheel 49 and cam 48 to be rotated again. After making about one-half revolution, the engaged wheel 49 and cam 48 are restored to their original positions, so that the engaging portion 50a drops into the cutout 49a to lock the engaged wheel 49 and cam 48 in such positions.

Figure 7:
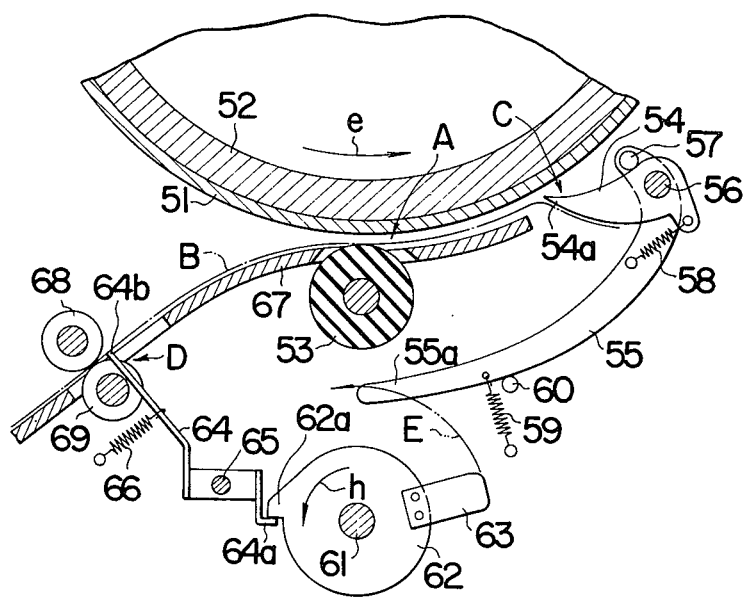
FIG. 7 is a sectional side view of the sheet stripping device comprising a second embodiment of the invention.

FIG. 7 shows sheet detection means using no switch and sheet pick-off claw means control means using no solenoid. As shown, the transfer-printing station A is disposed below a drum 52 having an intermediate image forming layer 51 (photosensitive material layer or dielectric layer) on its peripheral surface. A transfer-printing roller 53 in the transfer-printing station A is maintained in pressing engagement with the peripheral surface of the drum 52.

Disposed rightwardly downwardly of the drum 52 is a sheet stripping station C in which is disposed sheet pick-off claw means 54 including claws 54a and pivotally supported by a shaft 56 which supports a pick-off claw means control lever 55 for pivotal motion. The control lever 55 has attached to one end thereof a pin 57 against which the sheet pick-off claw means 54 is positioned by the biasing force of a spring 58. The control lever 55 has the other end portion 55a positioned against a pin 60 by the biasing force of a spring 59. The end of the other end portion 55a extends into a path E of rotation of a projecting plate 63 attached to a cam 62 rotatably mounted on a shaft 61.

The cam 62 is formed on its edge with an engaged portion 62a that is maintained in engagement with an engaging portion 64a of a sheet detection lever 64 which is pivotally supported by a shaft 65 and urged by the biasing force of a spring 66 to bring the engaging portion 64a into engagement with the peripheral surface of the cam 62.

The sheet detection lever 64 also has a sheet detection portion 64b which is positioned in the sheet path B defined by a guide plate 67 extending leftwardly downwardly of the drum 52 and sheet conveyor rollers 68 and 69 maintained in pressing engagement with each other. When the detection portion 64b of the sheet detection lever 64 is not pushed by the leading end of the copy sheet 2, the engaging portion 64a of the detection lever 64 locks the cam 62 in position, and the pick-off claw means control lever 55 having its end portion 55a positioned against the pin 60 has its pin 57 cause the claws 54a of the sheet pick-off claw means 54 to move away from the peripheral surface of the drum 52.

In operation, the copy sheet 2 moving along the sheet path B pushes and moves the detection portion 64b of the sheet detection lever 64. This releases the engaging portion 64a of the lever 64 from engagement with the engaged portion 62a of the cam 62 to thereby release the cam 62. The cam 62, which is in frictional engagement with the shaft 61, has remained stationary in a position in which the projecting plate 63 is located a large distance from the end portion 55a of the pick-off claw means control lever 55 while the engaging portion 64a of the lever 64 was in engagement with the engaged portion 62a of the cam 62. However, upon release of the engaging portion 64a from the engaged portion 62a, the cam 62 is connected to the shaft 61 and begins to rotate at a predetermined constant rate in the direction of an arrow h.

After lapse of a predetermined time interval following initiation of rotation of the cam 62, the projecting plate 63 pushes the end portion 55a of the control lever 55 and causes the lever 55 to move leftwardly about the shaft 56. This allows the claws 54a of the sheet pick-off claw means 54 to be moved into a shaft pick-off position in which they are maintained in engagement with the peripheral surface of the drum 52 by the biasing force of the spring 58. The configuration of the cam 62 is set such that the leading end of the copy sheet 2 is introduced into the sheet stripping station C immediately following the movement of the sheet pick-off claw means 54 into the sheet pick-off position, so that a sheet pick-off operation can be performed without a hitch.

Upon completion of a sheet pick-off operation, the projecting plate 63 releases the control lever 55, and the sheet detection lever 64 moves into a position in which it again locks the cam 62 as the trailing end of the copy sheet 2 emerges from the detection station D, so that the engaged portion 62a of the rotating cam 62 is engaged by the engaging portion 64a of the detection lever 64.

FIG. 8 to FIG. 11 show another embodiment of the invention in which a drum 15 is supported by a shaft 16 which also supports a gear 70 maintained in meshing engagement with another gear 71 supported by a cam shaft 35.

Figure 8:
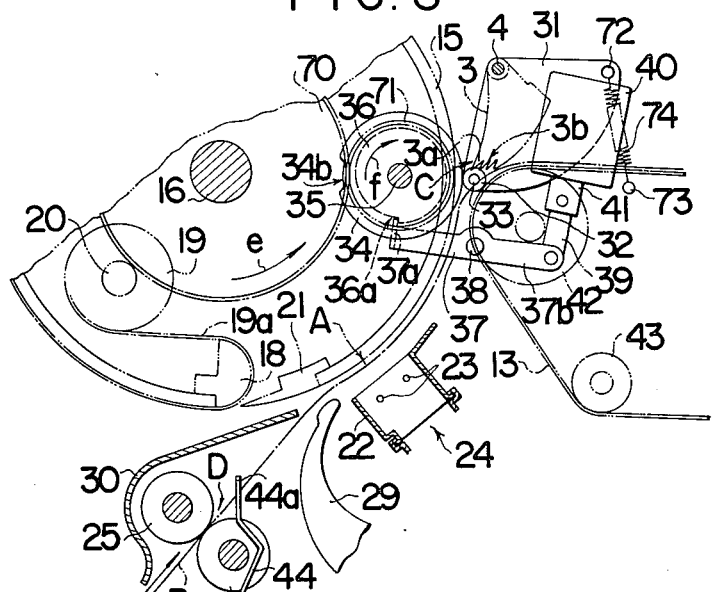
FIG. 8 is a sectional side view of the sheet stripping device comprising a third embodiment of the invention.
Figure 9:
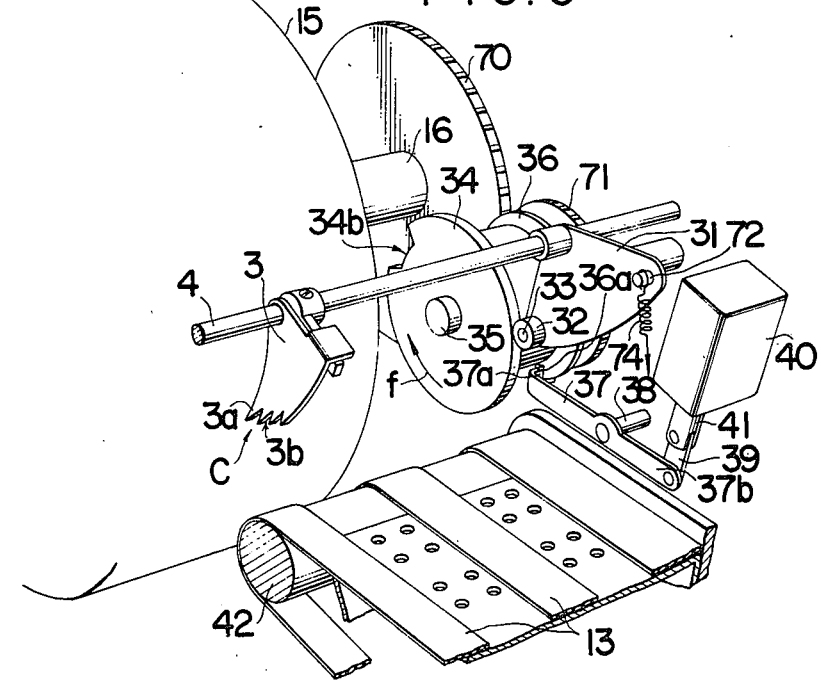
FIG. 9 is a perspective view of the sheet stripping device shown in FIG. 8.
Figure 10:
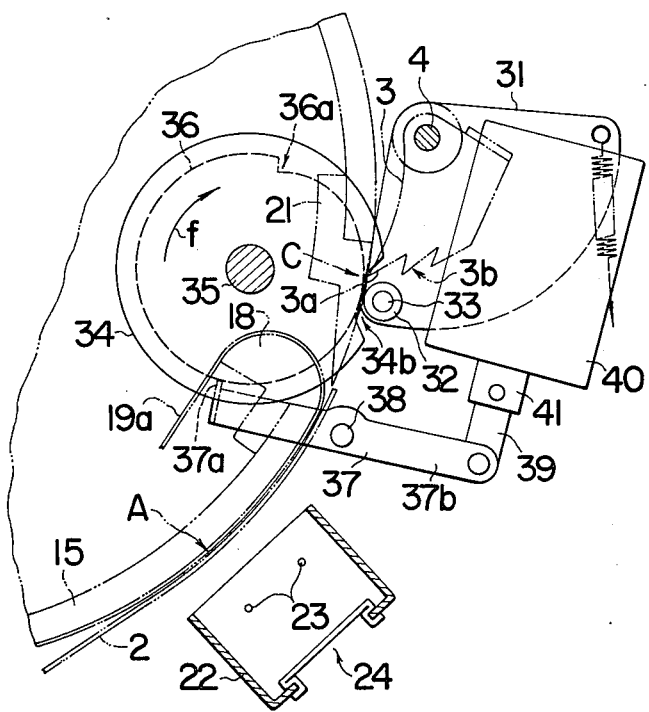
FIG. 10 and FIG. 11 are sectional side views showing the manner of operation of the device shown in FIG. 7.

In FIG. 8 and FIG. 9, the cam shaft 35 is shown as supporting a cam 34 and an engaged wheel 36 which is integral with the cam 34 and operatively connected to the gear 71 through a known friction clutch, spring clutch or the like. The engaged wheel 36 is formed with a cutout 36a which is positioned against an engaging portion 37a of a lock lever 37 which locks the engaged wheel 36 in position when the solenoid 40 is not energized.

A roller 32 attached to a lower end portion of a sheet pick-off claw means control member 31 is maintained in pressing engagement with the peripheral surface of the cam 34 by the biasing force of a spring 74 mounted between a right shoulder of the control member 31 and another pin 73 attached to an immovable member (not shown).

In operation, if the copy sheet 2 fed to the device in a position shown in FIG. 8 pushes and moves the sheet detection lever 44 at the sheet detection station D, then the sheet detection switch (See FIG. 2) is closed and the solenoid 40 is energized. This releases the engaging portion 37a of the lock lever 37 from engagement with the cutout 36a in the engaged wheel 36, thereby permitting the engaged wheel 36 and cam 34 to be driven by the gear 71 in the direction of the arrow f. As soon as the engaged wheel 36 and cam 34 begin to rotate, the engaging portion 37a of the lock lever 37 is released from locking engagement with the cutout 36a formed in the engaged wheel 36 and moves to a position in which it abuts against the edge of the cam 34 because the influence of the solenoid 40 on the lever 37 is removed.

The cam 34 is formed wth a valley 34b which is brought to a position in which it is positioned against the roller 32 about the time the leading end portion of the copy sheet 2 draws near the sheet stripping station C after the intermediate image on the peripheral surface of the drum 15 is printed thereon at the transfer-printing station A. Thus, the roller 32 drops into the valley 34b and causes the pick-off claw means control member 31 to move rightwardly about the shaft 4, thereby bringing the sheet pick-off claw means 3 to its sheet pick-off position shown in FIG. 10.

Figure 11:
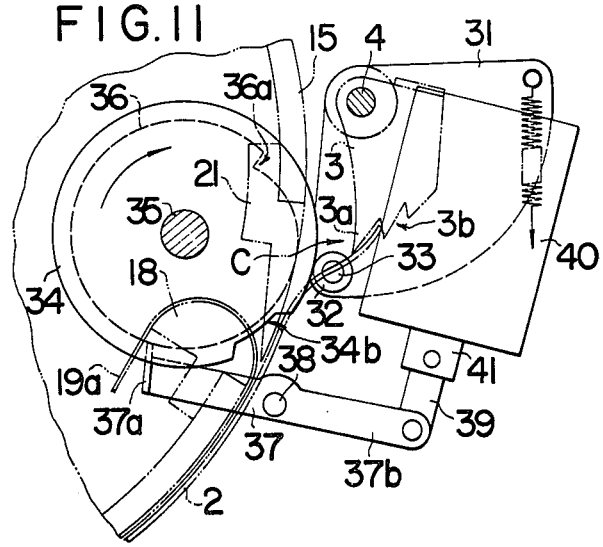

Upon the claws 3a being positioned against the drum 15, the leading end of the copy sheet 2 moving with the drum 15 is picked off the peripheral surface of the drum 15 by the claws 3a as shown in FIG. 11. The copy sheet 2 pushes the sheet pick-off claw means 3 and itself moves on to the upper run of the endless belt 13.

As soon as the leading end of the copy sheet 2 shifts to the belt 13, the sheet pick-off claw means 3 separates itself from the leading end of the copy sheet 2 and moves toward the drum 15. However, since the roller 32 is out of engagement in the valley 34b at this time, the sheet pick-off claw means 3 moving toward the drum 15 is not restored to the sheet pick-off position but assumes a position which is spaced and removed from the sheet pick-off position.

On the other hand, the cam 34 continues to rotate till the engaged wheel 36 is locked by the lever 37, and is restored to its original position when the engaged wheel 36 is locked by the lever 37. In this embodiment, the cam 34 is shown and described as being driven by the drum shaft 16. It is to be understood, however, that the invention is not limited to this specific form of cam drive shaft and that any form of cam drive shaft may be used so long as the time of initiation of rotation of the cam 34 is determined by detecting the movement of the copy sheet.

In the invention, a sheet jam detection switch SW2 (See FIG. 12) may be additionally provided in the sheet stripping station C or in the vicinity thereof so as to detect sheet jam throughout the sheet detection and sheet stripping operations. This ensures that the degree of precision with which the sheet pick-off claw means functions is increased.

Figure 12:
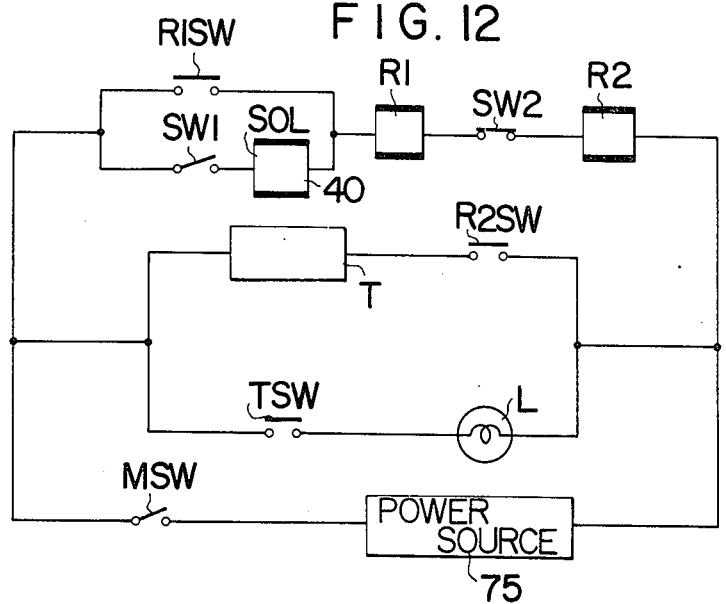
FIG. 12 is a diagram showing the sheet jam warning signal producing circuit used in the invention in association with the sheet detecting means and the sheet jam detection means.

In FIG. 12, the sheet detection switch SW1 is connected to a power source 75 through a main switch MSW. The solenoid 40, a relay R1, the normally closed sheet jam detection switch SW2 and a relay R2 are connected in series with the switch SW1 in the indicated order. The relay R1 has a contact R1SW connected in shunt with the switch SW1 and solenoid 40 so as to hold the relay R1. The sheet jam detection switch SW2 is supported in the sheet stripping station C or in the vicinity thereof by the same means as supporting the sheet detection switch SW1. For example, the switch SW2 may be disposed in the sheet path between the transfer-printing station A and the sheet stripping station C or near the endless belt 13. The sheet jam detection switch may be replaced by other means, e.g. detection means using a photoelectric transducer element.

A circuit comprising a timer means T and a contact R2SW of the relay R2, disposed in parallel with a lamp L connected to a contact TSW of the timer means T is connected across the main switch MSW and power source 75 and disposed parallel to the circuit arm comprising the sheet detection switch SW1 and sheet jam detection switch SW2. The timer means T is set such that it remains operative for a time interval slightly longer than the time elapsing after the sheet detection switch SW1 is closed by the copy sheet till the sheet jam detection switch SW2 is closed by the copy sheet 2 moving at normal rate.

In operation, upon closing of the sheet detection switch SW1 as a copy sheet is detected following closing of the main switch MSW, the solenoid 40 is energized and at the same time the relays R1 and R2 are actuated because the sheet jam detection switch is a normally closed switch SW2, so that the contact R1SW of the relay R1 is closed and the relay R1 is self-held. Actuation of the relay R2 closes the contact R2SW to render the timer means T operative. However, if the copy sheet moves without a hitch along its path of movement, then the sheet jam detection switch SW2 is opened by the copy sheet and the relay R2 is de- actuated, so that the operation of the timer means T is interrupted before the period set for the operation of the timer means T expires. The timer means T is of the type which comprises a CR time-constant timer and relay connected thereto, for example. The timer means T is restored to its initial position when its operation is interrupted or when the supply of a current thereto is cut off even after it has operated till the period set for the operation expires. The timer means T may be of the mechanically, electrically or otherwise operated type.

If a sheet jam occurs before a sheet reaches the sheet jam detection switch SW2 following the closing of the sheet detection switch SW1 by the copy sheet, then the sheet jam detection switch SW2 is not opened. Thus the timer means T operates till the period set for its operation expires, and closes its contact TSW to turn on the lamp L at the intermediate of its operation. It will be seen that the lighting of the lamp L serves as a warning signal for the occurrence of a sheet jam. Therefore, it is necessary to turn off the main switch MSW and take other necessary steps when the lamp L is turned on. The lamp L may be replaced by a buzzer. Alternatively, a relay may be used in the circuit of the lamp L so as to cut off the current supply to all the circuit blocks or to the solenoid 40 only by such contact.

The provision of the sheet jam detection switch SW2 cooperating with the sheet detection switch SW1 is effective to detect the occurence of a sheet jam, and enables a warning to be issued or the cutoff of the current supply to all the circuit blocks or to the solenoid 40 alone. This is conducive to prevention of a leak, fire or other accident, and keeps the sheet pick-off claw means from performing a sheet pick-off operation without any sheet in the sheet stripping station.

What is claimed is:

1. A copy sheet stripping device for use with an electrophotographic apparatus of the type comprising a movable member adapted to carry an intermediate image thereon and move through a transfer-printing station where the intermediate image is printed on a copy sheet by transfer-printing, such device comprising:
    a. sheet pick-off claw means disposed in a sheet stripping station for picking off from said movable member the copy sheet on which the intermediate image has been printed;
    b. sheet pick-off claw means control means for moving said sheet pick-off claw means to a sheet pick-off position before the leading end of the copy sheet reaches the sheet stripping station so that the copy sheet may be stripped off the movable member, said control means comprising a rotatable cam and a pick-off claw means control member adapted to be moved in pivotable motion by said cam after the lapse of a predetermined time interval; and
    c. sheet detection means disposed in the path of movement of the copy sheet for detecting the presence of the copy sheet and actuating said sheet pick-off claw means control means as the copy sheet moves along the path of its movement, said sheet detection means comprising a lever having one end extending into the path of movement of the copy sheet and another end positioned against said rotatable cam for controlling cam rotation by the pivotable movement of said lever.

2. A copy sheet stripping device for use with an electrophotographic apparatus of the type comprising a movable member adapted to carry an intermediate image thereon and move through a transfer-printing station where the intermediate image is printed on a copy sheet by transfer-printing, said device comprising:
  a. sheet pick-off claw means disposed in a sheet stripping station for picking off from said movable member the copy sheet on which the intermediate image has been printed, said claw means comprising:
    i. a plurality of claw members, each having a free end formed in sawtooth fashion;
    ii. means for supporting each of said claw members for individual pivotal movement about a common axis; and
    iii. means for urging said claw members in pivotal movement about said common axis toward their respective sheet pick-off positions whereat the leading end of the transfer-printed copy sheet on the movable member is received in one of the valleys of the sawteeth on each of the claw members so as to move said claw members in pivotal motion against the action of said urging means;
  b. cam means for normally inhibiting said claw members from assuming their sheet pick-off positions until immediately before the leading end of the copy sheet reaches the sheet stripping station and for thereupon releasing said claw members to permit them to assume their sheet pick-off positions so that the copy sheet may be stripped off the movable member, said cam means comprising:
    i. a rotatable cam; and
    ii. drive means for rotating said cam through a frictional force at a predetermined rate;
  c. means for locking said rotatable cam in a predetermined angular position against the action of said frictional force;
  d. sheet detection means, including an actuator disposed in the path of movement of the copy sheet at a position before the sheet stripping station, for producing a detection signal when said actuator is engaged and pushed by the leading end of the copy sheet; and
  e. means for actuating said locking means in response to said detection signal to release said rotatable cam thereby permitting said claw members to assume their respective sheet pick-off positions.

3. A copy sheet stripping device according to claim 2 wherein said cam means further comprises an actuation member adapted to be moved in pivotal motion by said rotatable cam for allowing said claw members to assume their sheet pick-off positions, and said actuating means comprises a solenoid adapted to be energized upon receipt of said detection signal.

4. A copy sheet stripping device according to claim 2 further comprising timer means connected to said sheet detection means, sheet jam detection means disposed in the vicinity of the sheet stripping station, and sheet jam warning means connected to said timer means.

* * * * *